United States Patent [19]

Morgan et al.

[11] 4,228,245
[45] Oct. 14, 1980

[54] FOAM RUBBER POLYBLEND

[75] Inventors: Albert W. Morgan, Collinsville, Ill.; Roland G. Ribaudo, St. Louis, Mo.

[73] Assignee: Monsanto Company, St. Louis, Mo.

[21] Appl. No.: 53,871

[22] Filed: Jul. 2, 1979

Related U.S. Application Data

[63] Continuation of Ser. No. 934,759, Aug. 21, 1978, abandoned, which is a continuation-in-part of Ser. No. 873,760, Jan. 30, 1978, abandoned, which is a continuation-in-part of Ser. No. 592,306, Jul. 1, 1976, abandoned, which is a continuation-in-part of Ser. No. 454,490, Mar. 25, 1974, abandoned.

[51] Int. Cl.$^2$ ............................ C08J 9/04; C08J 9/10
[52] U.S. Cl. ...................................... 521/75; 260/34.2; 260/DIG. 24; 428/521; 521/85; 521/92; 521/139; 521/907; 521/909
[58] Field of Search .................. 521/75, 139, 140, 134

[56] References Cited

U.S. PATENT DOCUMENTS

| | | | |
|---|---|---|---|
| 2,743,931 | 5/1956 | Pooley et al. | 260/2.5 P |
| 2,840,534 | 6/1958 | Clark et al. | 260/2.5 P |
| 2,849,028 | 8/1958 | Clark et al. | 260/2.5 P |
| 3,322,858 | 5/1967 | Coaker et al. | 260/876 |
| 3,522,330 | 7/1970 | Montgomery | 260/889 |
| 3,563,402 | 2/1971 | Arnold | 260/890 |
| 3,641,208 | 2/1972 | Hall et al. | 260/876 |
| 3,695,477 | 10/1972 | Edmonston et al. | 260/2.5 P |

*Primary Examiner*—Morton Foelak
*Attorney, Agent, or Firm*—George R. Beck; Paul D. Matukaitis

[57] ABSTRACT

Foamed polyblends comprising a filled styrene-butadiene rubber are rendered attractively flame-resistant (e.g. for use as carpet underlay) without loss of "green strength" needed during processing (e.g. in a Banbury mixer) by blending therewith about 10–50 parts per hundred, based on the rubber, of a pre-fused vinyl chloride polymer plastisol.

30 Claims, No Drawings

FOAM RUBBER POLYBLEND

This is a continuation, of application Ser. No. 934,759, filed Aug. 21, 1978 now abandoned, as a continuation-in-part of application Ser. No. 873,760, now abandoned, filed Jan. 30, 1978 as a continuation-in-part of application Ser. No. 592,306, now abandoned, filed July , 1976 as a continuation-in-part of application Ser. No. 454,490, now abandoned, filed Mar. 25, 1974.

BACKGROUND OF THE INVENTION

This invention relates to flame-resistant materials, and particularly to foam (sponge) rubber backing materials, e.g. for carpet. Specifically, the invention provides a novel sponge rubber carpet underlay material highly resistant to burning.

The term "carpet" herein refers to natural or synthetic floor coverings. A common carpeting at the present time comprises a fabric base with yarn tufts extending upwardly from the base and forming the pile of the carpet. Various methods are known to those skilled in the art for constructing the base and attaching pile yarns to it.

Ordinarily, an underlay material, generally a foam rubber material, is used as a base over which carpet is laid to provide greater resilience and to cushion the carpeting material. Foamed or sponge rubber underlays are well known, particularly those prepared from styrene-butadiene rubber (hereinafter for convenience called SBR). Such rubber underlays are not intrinsically fire-resistant, howwever, and it is known to incorporate polyvinyl chloride therein to impart flame resistance to the underlay. Unfortunately, addition of untreated polyvinyl cloride to a styrene-butadiene latex normally results in the latex being not self-supporting and therefore difficult to process. On the other hand, in the preparation of a sponge underlay of SBR wherein a solids system (rather than a latex) is used, the underlay is prepared by calendaring particulate SBR material, stripping the resulting self-supporting continuous sheet from the calender and feeding that sheet to other mechanical processing means, e.g. conveyor belts, cooling rollers and calendars. Addition of a vinyl chloride polymer, e.g. polyvinyl chloride, to SBR in such a process similarly destroys the "green strength" of the rubber, thereby destroying its self-supporting characteristic. The loss of that characteristic is significant because the sheet of rubber prepared in a calendaring process must be self-supporting so that the sheet can emerge from a calendar and retain its integrity over a short distance during which it is unsupported while being fed into a subsequent roller or calendar. Thus it is a significant problem in the carpeting industry to prepare a sponge rubber underlay, prepared by a calendaring process, which can be rendered fire resistant by addition of a vinyl chloride polymer without substantial loss of green strength of the underlay material.

SUMMARY OF THE INVENTION

In accordance with the present invention it has been found that a vinyl chloride polymer may be blended with an SBR, e.g. of a kind from which a flame-resistant carpet underlay can be prepared by calendaring process without substantial loss of green strength, if a plastisol of the vinyl chloride polymer has been fused prior to blending with the SBR particles to be processed.

PRIOR ART

U.S. Pat. No. 3,689,355 issued Sept. 5, 1972 to E. D. Hornbaker et al. describes a flame-resistant carpet backing, as opposed to a carpet underlay, prepared from a composition of a styrene-butadiene latex containing polyvinyl bromide. In that patent, polyvinyl bromide is incorporated in the latex rubber formulation to increase the flame resistance of the formulation when used as a carpet backing material adhered directly to the carpet proper. The method in the patent provides an SBR latex to which the polyvinyl bromide is added. The liquid composition is mechanically frothed or blown and then coated on the back of the carpet material, gelled and dried. In that process, the latex must obviously be supported and the support described is the partially built carpet for which the foamed rubber backing is desired. The temperatures of such a process must be rather low so that bromine does not evolve from the composition and to prevent the gelled latex from falling apart.

DESCRIPTION OF PREFERRED EMBODIMENTS

To utilize a vinyl chloride polymer, e.g. polyvinyl chloride, as a flame retardant in a 100% solids SBR carpet underlay, and still retain the green strength necessary for the solids composition to be conveniently processable, it has been determined that a plastisol of the vinyl chloride polymer, optionally containing customary formulating ingredients such as fillers, pigments, antioxidants and the like, must be fused before blending it with the SBR solids.

Following addition of the pre-fused vinyl chloride polymer composition to the SBR, the solids are blended in a Banbury mixer and dropped into a calender. The blend of solids is then calendared for a specified period of time and stripped from the calendar in a continuous, self-supporting sheet. The sheet is directed to a conveyor belt, the sheet supporting its own weight from the calendar to the conveyor belt. The conveyor belt then carries the sheet to cooling rolls during which the sheet is cooled and again directed to a calendar, supporting its own weight from the cooling rolls to the calendar. After the second calendaring, the rubber sheet enters an oven wherein the temperature is raised to activate the chemical blowing agents within the SBR. The material is thus chemically blown to produce a foamed vinyl chloride polymer/SBR polyblend composition suitable for use in a carpet underlay. The underlay is attractively flame-retardant due to the presence of the vinyl chloride polymer.

A more detailed description of the processing operations is as follows:

The Banbury mixer used in making SBR sponge is conventionally located on the second floor of a manufacturing facility. The ingredients for the sponge comprising SBR solids and any suitable filler and compounding agents, e.g. antioxidants, colorants, etc., are weighed and charged to the Banbury, a normal charge weighing about 295 kilograms. The SBR is charged first and mixed for about 3 minutes and then the compounding agents are charged and mixing continues until a temperature of about 82° C. is reached. The Banbury is then emptied, the mixture falling into a roll mill located directly below, on the first floor of the facility. The roll mill runs at about 200 rpm to further mix the materials. A small portion of the material is then peeled from the roller by the machine operator who then places the starter portion on a conveyor which moves the material to another roll mill for further mixing. Another starter portion is peeled from the second mill and fed to a conveyor which moves the material to a calendar which has been preset to a desired thickness. The compounded rubber is then continuously pulled from the calendar and run through the conveyor system. The rubber supports itself from calendar to conveyor and depends on its green strength for such self-support and to prevent sticking as it peels itself from the calendar. The compounded rubber is then put on a chain belt which transports the compounded rubber through an approximately 176° C. oven to effect foaming and cure.

Suitable conditions for processing and polyblending an SBR and a vinyl chloride polymer composition are as follows:

A representative vinyl chloride/vinyl acetate (95:5) interpolymer resin plastisol is prepared having the following formulation:

| Ingredient | Parts by Weight |
|---|---|
| Vinyl chloride interpolymer-paste grade resin | 100 |
| Santicizer® 160 plasticizer[1] | 80 |
| p,p'-Oxybis(benzenesulfonyl hydrazide) | 5 |
| Mark 553 Organozinc complex | 5 |
| Epoxidized linseed oil | 3 |
| Antimony oxide | 10 |

[1]Butyl benzyl phthalate (Monsanto)

Typically the plastisol is mixed and heated to 180° C. At 180° C. it fuses and, in accordance with the present invention, is used as a flame retardant when polyblended in SBR in suitable flame-retardant amounts, e.g., between about 10 and about 50 phr; preferably 20–40 phr (parts by weight per hundred parts of rubber).

Processing of the polyblend of SBR and vinyl chloride/vinyl acetate interpolymer is similar to conventional SBR processing. Thus SBR solids and fused vinyl chloride/vinyl acetate interpolymer plastisol are blended thoroughly, and then SBR compounding ingredients are added to the mixture. Mixing is continued while the temperature is raised to about 82° C., after which the material is processed as described hereinbefore.

Vinyl chloride polymers which can be used to prepare the fused plastisols include polyvinyl chloride and interpolymers of predominantly vinyl chloride with vinyl acetate and/or ethylene, e.g. vinyl chloride/vinyl acetate, ethylene/vinyl chloride, ethylene/vinyl chloride/vinyl acetate. Suitable SBR for use in this invention may contain from about 5 to about 50% styrene and conversely, from about 95 to about 50% butadiene.

To prepare the vinyl chloride polymer plastisols employed in this invention there may be used any of the conventional plasticizers such as, e.g. trialkyl, dialkyl aryl, alkyl diaryl or triaryl phosphates; dicarboxylates such as dialkyl, alkyl aryl or diaryl phthalates, isophthalates, terephthalates, adipates, azealates, sebacates, pimelates, and succinates; and other carboxylates such as benzyl stearate, alkylene glycol dibenzoates, etc. Preferably the plastisol comprises between about 0.7 and about 3 parts of the plasticizer per part by weight of vinyl chloride polymer.

Fusion of the plastisol is dependent on the particular vinyl chloride polymer and plasticizer being used, the concentration of plasticizer in the vinyl chloride polymer, the temperature and length of time the temperature is held. In general, the higher the concentration of plasticizer, the faster will fusion occur at lower temperatures. Ordinarily, satisfactory fusion occurs at temperatures of from at least about 140° C. up to about 200° C., a typically preferred range being from about 160° C. to about 185° C.

The following examples illustrate specific embodiments of the invention but are not intended as a limitation thereof. Unless otherwise indicated, all parts, percentages, ratios and the like are by weight.

EXAMPLE 1

Twenty batches of 100%-solids SBR are prepared to test the strength of each on addition of a vinyl chloride/vinyl acetate interpolymer thereto in accordance with the invention. The rubber formulations (parts by weight) are in Table 1.

TABLE 1

| | Rubber Batch No. | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| Rubber[1] | 90 | → | → | → | → | → | → | → | → | → | → | → | → | → | → | → | → | → | → | 50 |
| Whiting | 124 | 124 | 112.5 | → | → | → | → | → | 75 | | 124 | 124 | 112.5 | 124 | → | → | → | → | → | → |
| Clay | 114 | 114 | 105 | → | → | → | → | → | 75 | | 114 | 114 | 105 | 114 | → | → | → | → | → | → |
| Sulfur | 3 | 3 | 2.2 | → | → | → | → | → | → | → | 3 | 3 | 2.2 | → | → | → | → | → | → | → |
| $Z_n$ oxide | 4 | 4 | 4.5 | → | → | → | → | → | → | → | 4 | 4 | 4.5 | 4 | → | → | → | → | → | → |
| TMTD[2] | 2 | 2 | 3.4 | → | → | → | → | → | → | → | 2 | 2 | 3.4 | 2 | → | → | → | → | → | → |
| MBT[3] | 2.7 | 2.7 | 3.4 | → | → | → | → | → | → | → | 2.7 | 2.7 | 3.4 | 2.7 | → | → | → | → | → | → |
| Celogen OT[4] | 4 | 4 | 3 | → | → | → | → | → | → | → | 4 | 4 | 3 | 4 | → | → | → | → | → | → |
| Na carbonate | 5 | 5 | | | | | | | | | 5 | 5 | | 5 | → | → | → | → | 6 | 6 |
| Ti dioxide | 6 | 6 | | | | | | | | | 6 | 6 | | 6 | 6 | 6 | | | | |
| Stearic Acid | 5.3 | 5.3 | | 5 | → | → | → | → | → | → | 5.3 | 5.3 | 5 | 5.3 | → | → | → | → | → | → |
| Urea | 4 | 4 | 3 | → | → | → | → | → | → | → | 4 | 4 | 3 | 4 | 4 | 2 | → | → | → | → |
| Al trihydrate | | | | | | | | | 225 | 225 | | | | | | | | | | |
| Prespersion B[5] | | | 11.2 | → | → | → | → | → | → | → | → | → | → | → | | | | | | |
| Sb oxide | | | | | 2 | | | | | | | | | | | | | | | |
| Mark W.S.[6] | | | | | | | | 1.3 | | | | | | | | | | | | |
| Oil[7] | 85 | 85 | 75 | → | → | → | → | → | → | → | → | → | → | → | → | → | → | 80 | 80 | 75 |

[1]Styrene/butadiene interpolymer (23.5% bound styrene, Mooney visc. = 25/100° C.)
[2]Tetramethylthiuram disulfide
[3]2-Mercaptobenzothiazole
[4]p,p'-Oxybis(benzenesulfonyl) hydrazide
[5]Sodium bicarbonate in light oil
[6]Ba/Cd laurate
[7]Naphthenic oil, ASTM Type D-2226, Type 104A, Viscosity 1200@SUS 38° C.

To the Table 1 batches there are added varying amounts of vinyl chloride/vinyl acetate interpolymer plastisol compositions which have been fused at a temperature of 165° C. The plastisol formulations (parts by weight based on vinyl chloride/vinyl acetate) are in Table 2.

TABLE 2

| Ingredients | Plastisol No. | | | |
|---|---|---|---|---|
| | 1 | 2 | 3 | 4 |
| Vinyl chloride/vinyl acetate (95:5) resin | 100 | → | → | → |
| Santicizer ® 160 plasticizer | 80 | → | → | → |
| p,p'-oxybis(benzene-sulfonyl hydrazide | 5 | → | → | → |
| Organozinc complex | 5 | | | |
| Epoxidized linseed oil | 3 | → | → | → |
| Antimony oxide | 10 | → | → | → |
| Organometallic stabilizer | | 5 | → | → |
| Santicizer 140 plasticizer[1] | | | 20 | 20 |
| Azodicarbonamide | | | | 4.25 |
| Blowing Agent | | | | .75 |
| Organolead stabilizer | | | | 2 |

[1]Cresyl diphenyl phosphate (Monsanto)

The formulations of Tables 1 and 2 are blended in the proportions shown in Table 3 and the resulting blends are tested for green strength by processing them on a Banbury mixer and a rubber mill. Results are in Table 3.

TABLE 3

| Plastisol No.* | Rubber Batch No. | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| 1 | 20 | | 22.5 | | | | | | | | 30 | | | | | | | | | |
| 2 | | 20 | | 22.5 | 30 | 30 | | 30 | 30 | | | 30 | | | | | | | | |
| 3 | | | | | | | 30 | | | 30 | | | | | | | | | | |
| 4 | | | | | | | | | | | | | 30 | → | → | → | → | → | → | 70 |
| Banbury: | S | S | G− | G− | G+ | G− | G− | G− | G− | S+ | S+ | G− | G+ | G++ | G++ | G+ | G+ | G+ | G+ | G+ | S− |
| Mill: | S | S | G− | G− | G+ | G− | G− | G− | G− | S+ | S+ | G− | G+ | G++ | G++ | G+ | G+ | G+ | G+ | G+ | S− |

*The amounts of plastisol are in parts per batch.
In the above table,
S = sticks
S− = heavy sticking-Will not process.
S+ = light sticking
G− = borderline
G = good
G+ = better ⎱ No sticking. Processes satisfactorily.
G++ = best ⎰

The data show that maintenance of green strength, when adding a fused vinyl chloride polymer plastisol, is partially dependent on the filler concentration in the rubber formulation. Further, the data show that the ratio of plastisol to filler in the rubber is a key for determining the processability of the polyblend. The materials in Table 1 which are fillers are whiting, clay, titanium dioxide, aluminum trihydrate and antimony oxide. If the plastisol to filler ratio is below 0.09 (polyblends 1, 2 and 9) processing is not successful. If the ratio exceeds 0.25 (polyblend 20) processing is impaired. Best results in this series were obtained with ratios of 0.1 to 0.2, preferably about 0.12 to about 0.14. Preferably, in a 40–45% filler range, the plastisol level should be such that a 0.1 to 0.2 ratio of plastisol to filler is maintained. As the filler level is increased, the fused plastisol level is advantageously also increased.

In polyblends analogous to those of Example 1, similar results are obtained using polyvinyl chloride, ethylene/vinyl chloride interpolymer or ethylene/vinyl chloride/vinyl acetate interpolymers.

EXAMPLE 2

This example shows that, contrary to the present experience of those skilled in the art, the addition of a plastisol of a vinyl chloride polymer (when pre-fused for use in accordance with the invention) does not result in substantial deterioration of green strength. Tables 4–6 illustrate the addition of 30 parts of vinyl chloride polymer plastisols pre-fused at 170° C. in seven rubber batches and the results obtained.

TABLE 4

| Ingredients | Rubber Batch No. (Parts by Weight) | | | | | | |
|---|---|---|---|---|---|---|---|
| | 1 | 2 | 3 | 4 | 5 | 6 | 7 |
| Styrene/butadiene interpolymer | 150 | 150 | 120 | 120 | 120 | 90 | 90 |
| Clay | 140 | 140 | 140 | 112 | → | → | → |
| Whiting | 150 | 150 | 150 | 120 | → | → | → |
| Zn Oxide | 7.5 | 7.5 | 6 | → | → | → | → |
| Tetramethylthiuram disulfide | 4.5 | → | → | → | → | 3.6 | 3.6 |
| 2-Mercaptobenzo-thiazole | 4.5 | → | → | → | → | → | → |
| Sulfur | 3 | → | → | → | → | 2.4 | 2.4 |
| p,p'-Oxybis(benzene-sulfonyl hydrazide) | | 4 | → | → | → | → | → |
| Urea | | 4 | → | → | → | → | → |
| Naphthenic Oil | 100 | 100 | 100 | 80 | → | → | → |
| Na bicarbonate in light oil | 15 | 15 | 15 | 12 | → | → | → |

TABLE 5

| Ingredients | Plastisol No. (Parts by Weight) | | |
|---|---|---|---|
| | 1 | 2 | 3 |
| Vinyl Chloride/Vinyl Acetate (95:5) resin | 50 | → | → |
| Epoxidized linseed oil | 5 | → | → |
| Lead Phosphate | 5 | 5 | 4 |
| Santicizer ® 140 plasticizer | 50 | | 30 |
| Santicizer 711 plasticizer[1] | 45 | 95 | 45 |
| Antimony oxide | 10 | → | → |
| Santicizer 148 plasticizer[2] | | | 20 |
| Polybutene succinate | | | 1 |

[1]Mixed di(C₇-C₄ alkyl) phthalates (Monsanto)
[2]Isodecyl diphenyl phosphate (Monsanto)

TABLE 6

| Plastisol No.* | Rubber Batch No. | | | | | | |
|---|---|---|---|---|---|---|---|
| | 1 | 2 | 3 | 4 | 5 | 6 | 7 |
| 1 | 0 | 0 | 30 | 30 | 0 | 0 | 30 |
| 2 | 0 | 0 | 0 | 0 | 30 | 30 | 0 |
| 3 | 0 | 0 | 0 | 0 | 0 | 0 | 0 |
| Banbury: | Good | Good | Good | Good | Good | Good | Good- |
| Mill: | Good | Good | Good | Good | Good | Good | Good- |

*Amount of plastisol in parts per batch.

In Table 6, "Good" indicates satisfactory processing.

The data show that addition of a pre-fused vinyl chloride polymer plastisol does not result in substantial deterioration of processing characteristics. However, if vinyl chloride polymer which has not been similarly prefused is added in the above manner, the materials will not blend properly and cannot be milled satisfactorily.

EXAMPLE 3

In this example, two vinyl chloride/vinyl acetate plastisol compositions are prepared. Plastisol A in Table 7 is not fused. Plastisol B is pre-fused at 180° C. and then ground to a powder. All parts in Table 7 are by weight.

TABLE 7

| Ingredients | Plastisol Formulation | |
|---|---|---|
| | A (Unfused) | B (Pre-fused) |
| Vinyl chloride/vinyl acetate (95:5) resin | 50 | 50 |
| Santicizer ® 140 plasticizer | 50 | 50 |
| Santicizer 148 plasticizer | 48 | 48 |
| Epoxidized linseed oil | 2 | 2 |
| Alumina trihydrate | 45 | 45 |
| Antimony oxide | 5 | 5 |

Four SBR formulations are prepared as shown in Table 8, with all parts being by weight.

TABLE 8

| Ingredients | Rubber Batch No. | | | |
|---|---|---|---|---|
| | 1 | 2 | 3 | 4 |
| Styrene/butadiene interpolymer | 100 | 100 | 70 | 70 |
| Clay | 116 | 66 | 66 | 66 |
| Atomite | 112 | 62 | 62 | 62 |
| Alumina trihydrate | | 100 | 100 | 100 |
| Ti dioxide | 6 | 6 | 6 | 6 |
| Zn oxide | 5 | 5 | 5 | 5 |
| Na carbonate | 4 | 4 | 4 | 4 |
| Stearic acid | 5.3 | 5.3 | 5.3 | 5.3 |
| Coated urea | 4 | 4 | 4 | 4 |
| 2-Mercaptobenzothiazole | 2.5 | 2.5 | 2.5 | 2.5 |
| Tetramethylthiuram disulfide | 2 | 2 | 2 | 2 |
| p,p'-Oxybis(benzenesulfonyl hydrazide) | 2.2 | 2.2 | 2.2 | 2.2 |
| Sulfur | 3.7 | 3.7 | 3.7 | 3.7 |
| Naphthenic Oil | 104 | 104 | 74 | 74 |

The four batches of Table 8 are then evaluated for processing characteristics and flame retardance. Thus, Table 9 shows the results of incorporation of plastisols A and B of Table 7 into the SBR formulations of Table 8. The polyblends of Table 9 are evaluated for green strength and flame retardant properties.

TABLE 9

| Plastisol* | Batch No. | | | |
|---|---|---|---|---|
| | 1 | 2 | 3 | 4 |
| A | — | — | — | 30 |
| B | — | — | 30 | — |
| Banbury: | G | G | G | S |
| Mill: | G | G | G | S |
| pill** | F | F | P | P |

*Amounts of plastisol in parts per batch.
**Pill Test: DOC FF 1-70. A metheneamine timed burning tablet is placed on the center of eight carpet samples (22.5 cm × 22.5 cm) in a test chamber. The burning tablet is ignited. In order to pass the test, the charred area of at least seven of the eight samples must not extend to within 2.54 cm of the edge of a prescribed hole in a sample holding frame.

Batch 1 above contains no vinyl chloride polymer. Batch 2 contains no vinyl chloride polymer but does contain alumina trihydrate as a flame retardant. Batch 3 contains the pre-fused, powdered Plastisol B of Table 7. Batch 4 contains the unfused Plastisol A of Table 7.

The data show that Batches 1, 2 and 3 maintained green strength but that Batch 4 containing Plastisol A did not. Further, Batch 1 (control) and Batch 2 (alumina trihydrate as flame retardant) did not pass the pill test but Batches 3 and 4 did pass. Of the four batches, only the two vinyl chloride polymer plastisol-containing batches passed the pill test and, of those, only Batch 3 containing Plastisol B also maintained green strength.

Similar results are obtained using polyvinyl chloride, ethylene/vinyl chloride and/or ethylene/vinyl chloride/vinyl acetate interpolymers instead of the vinyl chloride/vinyl acetate resin in compositions otherwise like those evaluated in this example.

EXAMPLE 4

The importance of the vinyl chloride polymer plastisol being fused before blending with the SBR was further assessed by comparing processing characteristics of compositions of this invention with those of otherwise-similar compositions made by blending unfused plastisol with the SBR and then heating the resulting polyblend to temperatures on the order of those used to pre-fuse the plastisols employed in compositions of this invention. More specifically, polyblends having the same composition and prepared like that of Batch No. 3 in Table 9 (plastisol B pre-fused at 180° C. before blending with the SBR) were found to have good green strength and other Banbury processing characteristics at 20°, 80°, 100° and 130° C. (Above 130° C.(Above 130° C. the blowing agents began to decompose, forming usable sponge rubber products.) On the other hand, polyblends having the same composition and prepared like that of Batch No. 4 in Table 9 (unfused plastisol A blended with the SBR) were found to have the following processing characteristics when heated to the same temperatures:

20° and 80° C.—Stuck badly to the blades and Banbury sides, did not process well and fell apart because of insufficient green strength.

100° C.—Began to gel but degraded to a useless powder.

130° C.—Powdered more rapidly.

180° C.—Quickly formed a useless black powder.

These results demonstrated that inclusion of a pre-fused plastisol in an SBR composition in accordance with this invention is critically different from and provides results surprisingly superior to inclusion of an infused plastisol and then heating the resulting mixture to a temperature which would have been sufficient to pre-fuse the plastisol in the absence of the SBR.

We claim:

1. A foamed polyblend composition comprising a filled styrene-butadiene rubber blended with between about 10 and about 50 parts per hundred by weight, based on said rubber, of a vinyl chloride polymer plastisol which has been fused before being blended with said rubber, the weight ratio of said plastisol to the filler in said rubber being between about 0.09 and about 0.25.

2. Composition of claim 1, said plastisol having been fused at a temperature of at least about 140° C. before being blended with said rubber.

3. Composition of claim 1 wherein the polymer in said plastisol is polyvinyl chloride.

4. Composition of claim 1 wherein the polymer in said plastisol is a vinyl chloride/vinyl acetate interpolymer.

5. Composition of claim 1 wherein the polymer in said plastisol is an ethylene/vinyl chloride interpolymer.

6. Composition of claim 1 wherein the polymer in said plastisol is an ethylene/vinyl chloride/vinyl acetate interpolymer.

7. Composition of claim 1 wherein said ratio is between about 0.1 and about 0.2.

8. Composition of claim 7, said plastisol having been fused at a temperature between about 140° and about 200° C. before being blended with said rubber.

9. Composition of claim 8 containing between about 20 and about 40 parts per hundred by weight of plastisol based on said rubber.

10. Composition of claim 8 wherein said ratio is between about 0.12 and about 0.14.

11. A carpet underlay comprising the composition of claim 1.

12. A carpet underlay comprising the composition of claim 2.

13. A carpet underlay comprising the composition of claim 3.

14. A carpet underlay comprising the composition of claim 4.

15. A carpet underlay comprising the composition of claim 5.

16. A carpet underlay comprising the composition of claim 6.

17. A carpet underlay comprising the composition of claim 7.

18. A carpet underlay comprising the composition of claim 8.

19. A carpet underlay comprising the composition of claim 9.

20. A carpet underlay comprising the composition of claim 10.

21. A process for producing a flame-resistant styrene-butadiene foam rubber which comprises blending styrene-butadiene rubber with from about 10 to about 50 parts per hundred by weight, based on said rubber, of a vinyl chloride polymer plastisol which has been fused before being blended with said rubber.

22. Process of claim 21 wherein said rubber contains a filler and the amount of said plastisol blended with said rubber is such that the weight ratio of plastisol to said filler is between about 0.09 and about 0.25.

23. A process which comprises preparing a vinyl chloride polymer plastisol, fusing said plastisol at a temperature of at least about 140° C., blending about 10 to 50 parts by weight of the fused plastisol with about 100 parts by weight of a styrene-butadiene rubber containing a filler, and foaming the resulting blend.

24. Process of claim 23 wherein the amount of fused plastisol blended with said rubber is such that the weight ratio of plastisol to the filler in said rubber is between about 0.09 and 0.25.

25. Composition of claim 1, said plastisol having been prepared using plasticizer selected from dialkyl and alkyl aryl phthalates, alkyl diaryl and triaryl phosphates, and mixtures thereof.

26. Composition of claim 2, said plastisol having been prepared using plasticizer selected from dialkyl and alkyl aryl phthalates, alkyl diaryl and triaryl phosphates, and mixtures thereof.

27. Composition of claim 8, said plastisol having been prepared using plasticizer selected from dialkyl and alkyl aryl phthalates, alkyl diaryl and triaryl phosphates, and mixtures thereof.

28. Composition of claim 9, said plastisol having been prepared using plasticizer selected from dialkyl and alkyl aryl phthalates, alkyl diaryl and triaryl phosphates, and mixtures thereof.

29. Process of claim 21, said plastisol having been prepared using plasticizer selected from dialkyl and alkyl aryl phthalates, alkyl diaryl and triaryl phosphates, and mixtures thereof.

30. Process of claim 23, said plastisol having been prepared using plasticizer selected from dialkyl and alkyl aryl phthalates, alkyl diaryl and triaryl phosphates, and mixtures thereof.

* * * * *

UNITED STATES PATENT AND TRADEMARK OFFICE
CERTIFICATE OF CORRECTION

PATENT NO. : 4,228,245
DATED : October 14, 1980
INVENTOR(S) : Albert W. Morgan and Roland G. Ribaudo It is certified that error appears in the above-identified patent and that said Letters Patent are hereby corrected as shown below:

Column 1, line 33, "howwever" should read -- however --.

Column 6, Table 5, line 67, "$C_4$" should read -- $C_{11}$ --.

Column 8, line 47, "(Above 130°C." first occurrence should be deleted.

Column 8, line 66, "infused" should read -- unfused --.

Signed and Sealed this

Tenth Day of February 1981

[SEAL]

Attest:

RENE D. TEGTMEYER

Attesting Officer     Acting Commissioner of Patents and Trademarks